United States Patent [19]
Aufmkolk

[11] Patent Number: 4,960,091
[45] Date of Patent: Oct. 2, 1990

[54] SAFETY CIRCUIT FOR ELECTRONIC VELOCITY CONTROL OR REGULATING SYSTEMS FOR MOTOR VEHICLES

[75] Inventor: Rudolf Aufmkolk, Kelkheim, Fed. Rep. of Germany

[73] Assignee: VDO Adolf Schindling AG, Frankfurt am Main, Fed. Rep. of Germany

[21] Appl. No.: 338,877

[22] Filed: Apr. 14, 1989

[30] Foreign Application Priority Data

Oct. 29, 1988 [DE] Fed. Rep. of Germany ....... 3836913

[51] Int. Cl.$^5$ ...................... F02D 41/22; F02D 11/10
[52] U.S. Cl. ............................. 123/399; 123/198 D; 123/361
[58] Field of Search ................... 123/361, 399, 198 D, 123/339

[56] References Cited

U.S. PATENT DOCUMENTS

| | | | |
|---|---|---|---|
| 4,120,373 | 10/1978 | Fleischer | 123/399 X |
| 4,319,658 | 3/1982 | Collonia et al. | 123/340 X |
| 4,519,360 | 5/1985 | Murakami | 123/399 |
| 4,526,060 | 7/1985 | Watanabe | 123/339 X |
| 4,541,378 | 9/1985 | Kitamura | 123/399 X |
| 4,569,425 | 2/1986 | Kenny et al. | 123/339 X |
| 4,873,640 | 10/1989 | Burk | 123/352 X |

Primary Examiner—Tony M. Argenbright
Attorney, Agent, or Firm—Martin A. Farber

[57] ABSTRACT

In a safety device for electronic velocity control or regulating systems for motor vehicles with idling regulation in which a desired value can be fed to a setting device for the power of the engine of a motor vehicle and in which the setting device comprises a setting controller, an output stage and a setting member, there is provided a switch device which prevents the regulating of the output stage in a direction towards an opening of the throttle valve as a function of an output signal of a comparator. An actual-value signal corresponding to the position of the throttle valve and a limit value can be fed to the comparator, the limit value, at least upon a disconnection of the control or regulation, assuming a value necessary for idling control.

11 Claims, 3 Drawing Sheets

SAFETY CIRCUIT FOR ELECTRONIC VELOCITY CONTROL OR REGULATING SYSTEMS FOR MOTOR VEHICLES

FIELD AND BACKGROUND OF THE INVENTION

The present invention relates to a safety circuit for electronic velocity control or regulating systems for motor vehicles with idling control, in which a setting device for the power of the engine of the motor vehicle can be fed with a desired value and the setting device comprises a setting controller, an output stage and a setting member.

Velocity control systems for motor vehicles comprise, inter alia, an electromotive setting member, a quick-separation clutch and an underlying position control circuit which brings the electromotive setting member into the predetermined position corresponding to the command given by a controller. For reasons of safety, a disconnect device is provided which prevents an opening of the throttle valve when the velocity control system is off. Since the opening of the throttle valve is then not to be prevented merely temporarily, the disconnect device has storage properties, for which reason it is also referred to as a disconnect memory.

Similar safety devices are provided in so-called E-gas (electric gas) systems in which the position of the throttle valve is controlled on the basis of a command (electric signal) given by the accelerator pedal.

There are also known for motor vehicles devices for controlling the idling speed of rotation, wherein an air feed parallel to the throttle valve is controlled. This, however, means an additional expense, which can be avoided if the throttle valve is also used for controlling the idling. However, this is not possible in connection with the known E-gas systems and velocity control systems since, in the event of disconnect, an opening of the throttle valve is made impossible.

It is an object of the invention to propose a safety circuit for electronic velocity control or regulating systems for motor vehicles with idle control in connection with which, despite the fact that the control or regulating system is disconnected, actuation of the throttle valve for idle control is possible.

SUMMARY OF THE INVENTION

According to the invention, a switch device (18,44,45) is provided which prevents the regulating of the output stage (4) in the direction towards the opening of the throttle valve as a function of an output signal of a comparator (19,46), and an actual-value signal corresponding to the position of the throttle valve as well as a limit value can be fed to the comparator, the limit value assuming a value necessary for idle control at least upon the disconnecting of the control or regulation.

The safety circuit of the invention provides the advantage that, independently of the output signal of the controller, the position of the throttle valve is limited to a region which, on the one hand, permits idling control and, on the other hand, does not lead to conditions of travel which are critical from the standpoint of safety. Furthermore, the safety circuit of the invention can be produced with few structural parts.

Furthermore, the safety circuit of the invention provides the advantage that a return of the throttle valve into the idling region takes place rapidly even if the controller is provided with inertia, for instance in order to increase the comfort in travel.

In a further development of the invention, it is provided that the setting controller (1) and the output stage (4) are connected to a first line (16) for signals for regulating the output stage in the direction towards a closing of the throttle valve, and to a second line (17) for signals for regulating the output stage in the direction towards an opening of the throttle valve. The switch device (18) is arranged in the course of the second line (17).

Further according to the invention, a bridge output stage is provided with a separate control input (35,36) for each direction of rotation of the throttle valve, a resistor (37) is interposed in the feedline to the control input (36) actuation of which results in an opening of the throttle valve. The output of the comparator (19) is connected to the control input (36), which signal can be fed to a first input of a comparator (19) and the actual-value signal can be fed to a second input of the comparator.

Another feature of the invention is that the switch signal can be fed via a voltage divider (38,39).

Still another feature of the invention is that the comparator (19) is formed by an operational amplifier having an output with open collector.

Another further feature of the invention is that, as output stage (4), a bridge circuit having at least four semi-conductor switches (21-24) is provided and that one switch (21) of the two semi-conductor switches (21,24), which are brought into the conductive state for the opening of the throttle valve, is connected via the switch device (44,45) to one pole (25) of a source of operating voltage.

Further according to the invention, the switch device consists of two switches (44,45) connected substantially parallel to each other, a first one of which can be controlled by the switch signal and the second by the output signal of the comparator (46).

Moreover, the invention provides that the second switch is a transistor (51) the base of which is connected via a voltage divider to the non-inverting input of the comparator (46), that the terminal of the first switch (44) which faces away from the pole (25) of the source of operating voltage is connected via a diode (52) to the collector of the transistor (51), and by a resistor (60) and a second diode (61) is connected to the non-inverting input of the comparator (46). The second diode (61) is of opposite polarization when the first switch (44) is opened.

Still further according to the invention, in the case of an E-gas system the position of the accelerator pedal (15) is fed to the controller (5) as desired value, and the position of the setting member (2) is fed to it as actual value.

According to another feature of the invention, in the case of a velocity control system, a stored desired value can be fed to the controller (5) and, as actual value, the velocity of the vehicle can be fed to it.

Also according to a feature of the invention, the speed of rotation can furthermore be fed as actual value to the controller (5).

BRIEF DESCRIPTION OF THE DRAWINGS

With the above and other objects and advantages in view, the present invention will become more clearly understood in connection with the detailed description of preferred embodiments, when considered with the accompanying drawings, of which.

The same parts have been provided with the same reference numbers in the figures.

DETAILED DESCRIPTION OF THE PREFERRED EMBODIMENTS

Figure 1:
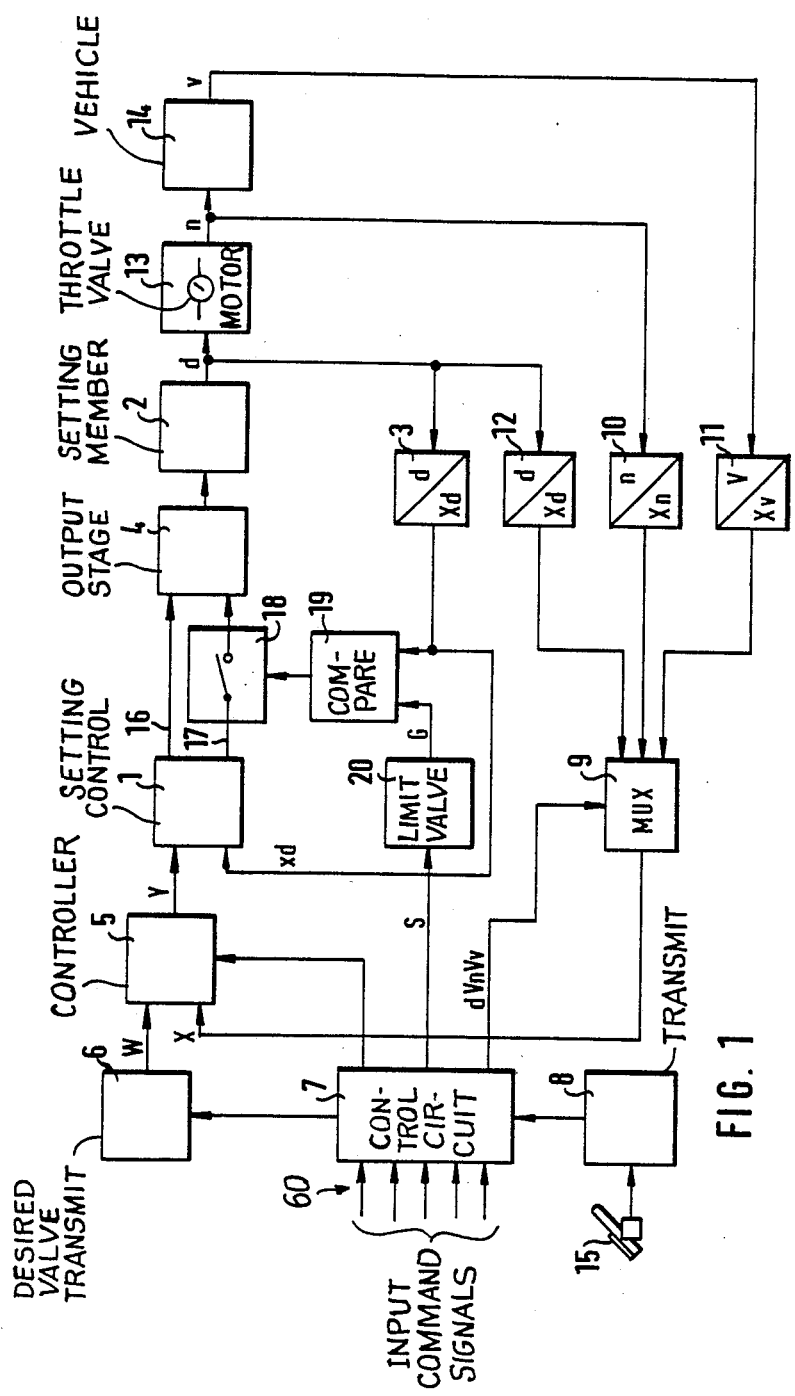
FIG. 1 is a block diagram of a first embodiment which serves both as velocity control system and as E-gas system.

The circuit arrangement shown in FIG. 1 can be used both for velocity control and as E-gas system. A position-control circuit for the throttle valve (not shown) consists of a setting controller 1, an output stage 4, a setting member 2 and a position transmitter 3 which converts the position of the throttle valve into an actual value. As desired value Wd, the correcting variable Y of the controller 5 is fed to the position-regulating circuit. From the difference between the desired value Wd and the actual value Xd, a correcting variable Yd is derived in the setting controller 1, corresponding to which the setting member 2 drives the throttle valve and thus controls the power of the engine 13. The speed of rotation n of the engine 13 is imparted to the vehicle 14 which moves with a velocity v. For the conversion of the speed of rotation n, the velocity v and the position of the throttle valve into electric actual-value signals there are provided transmitters 10, 11 and 12 respectively the outputs of which are connected to inputs of a multiplexer 9.

By means of the multiplexer 9, in each case one of the actual-value signals—referred to in the following as actual value x—can be fed to the controller 5. The multiplexer 9 is controlled from a control circuit 7 by the feeding of a signal which says that either the throttle valve position d or the speed of rotation n or the velocity v is to be used as actual value X.

The controller 5 receives a desired value W from a desired-value transmitter 6 which, in its turn, is controlled by the control circuit as a function of the instantaneous state of operation. Thus, for instance, when using the circuit arrangement as an E-gas system as shown in FIG. 1, the position of an accelerator pedal 15 is converted by means of a transmitter 8 into an electric signal which is forwarded by the control circuit 7 to the desired-value transmitter 6. In the case of a velocity control system, that velocity which is being traveled at the moment of the depression of a key, is stored as desired value in the control circuit 7, and forwarded to the desired-value transmitter 6.

Various command signals, S+B, S−B, WA, off, or brake, which are known in connection with the velocity control systems, are fed to the control device 7. Thus, for instance, actuation of the brake has the effect that the control circuit 7 is fed the signal BRAKE whereupon the control circuit disconnects the velocity control. Furthermore, in order to improve the control of the control circuit 7, various items of information are fed, such as, for instance, in what position an automatic transmission is, whether the air-conditioning system is on, whether the throttle valve is against the idle stop or against the full-load stop, whether the safety contact has responded and how high the temperature is. This information acts on parameters fed to the controller 5. Since such control circuits are known per se and their details are not necessary for an understanding of the invention, a more thorough description of the control circuit 7 will be dispensed with.

A disconnecting of the control can be brought about, for instance, as mentioned above, by various operating actions of the driver of the vehicle but it can, however, also be brought about by monitoring circuits upon the occurrence of errors. In each case, upon the disconnecting of the control, the throttle valve is to be moved back into the idle range, regardless of what correcting variable is given off by the controller 5.

For this purpose, in the embodiment of FIG. 1 there is used a switch 18 which is interposed in the line 17 between the setting controller 1 and the output stage 4. In normal operation, the switch is closed (conductive) so that setting of the throttle valve in both directions is possible. Pulses which are fed over the line 16 to the output stage effect a closing of the throttle valve while pulses on the line 17 effect an opening of the throttle valve. Depending on the ratio of the pulse widths, equilibrium is established at one position of the throttle valve. By a corresponding logic level of the switch signal S, the comparator 19 is without action.

However, if the switch signal S assumes a level representing the disconnecting of the control, then a limit value G is fed to the comparator 19 from the circuit 20, which limit value corresponds to the maximum permissible opening of the throttle valve up on the idling control. This limit value is compared in the comparator 19 with the actual-value signal Xd. If Xd is greater than G, the switch 18 remains closed so that, despite the fact that the control or regulation is disconnected, idling control remains possible. Only when the opening of the throttle valve will be greater than the maximum permissible opening for idling will Xd be greater than G, so that the switch 18 is opened. The pulses which are fed over the lines 16 to the output stage then effect a reduction in the opening of the throttle valve until Xd again drops below the limit value G and the switch 18 is thus closed again.

Figure 2:
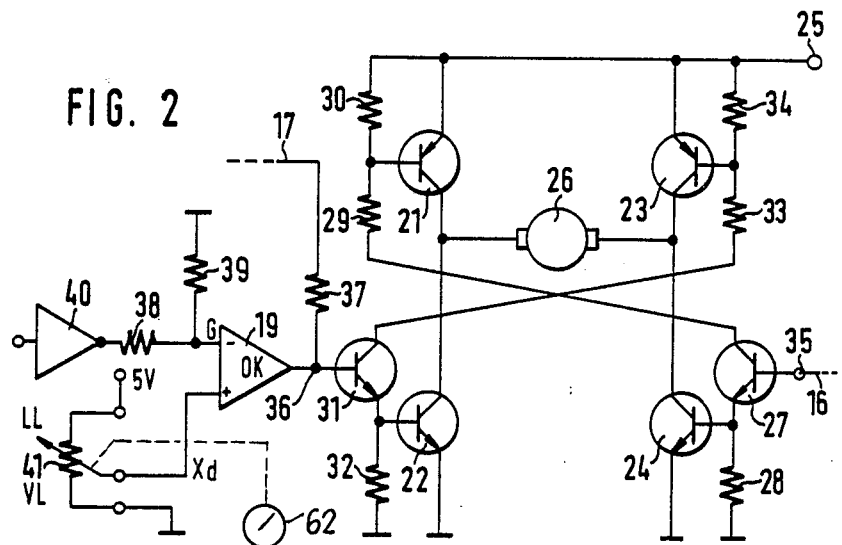
FIG. 2 is a part of the circuit arrangement of FIG. 1, shown in greater detail.

FIG. 2 shows in greater detail the output stage, the position transmitter 3, the switch 18, the comparator 19 and the circuit 20 for the establishing of the limit value. The output stage is developed as a bridge output stage and consists essentially, of two bridge branches, each having two transistors 21, 22, 23, 24. The transistors 21, 23 which are connected to the positive pole 25 of the source of operating voltage are PNP-transistors; and the transistors 22, 24, which are connected to ground, are of the NPN conductivity type. A motor 26 of the setting member 2 (FIG. 1) is contained in the bridge diagonal where, depending on direction of the rotation or drive, either the transistors 21 and 24 or the transistors 22, 23 are conductive. The transistors 21 and 24 are brought into the conductive state by means of a driver transistor 27, an emitter resistor 28 and collector resistors 29, 30 being associated with the driver transistor 27. The control of the transistors 22 and 23 is effected in similar manner with the aid of the driver transistor 31 which is connected to resistors 32, 33 and 34.

The base connections of the driver transistors 27 and 31 form the control inputs 35, 36 of the output stage. If a positive voltage is fed to the control connection 35, then there is a reduction in the opening of the throttle valve while in the case of a positive voltage at the control input 36, opening takes place. While the control input 35 is connected via the line 16 (FIG. 1) directly to the setting controller, the control input 36 is connected to the line 17 via a resistor 37. The control input 36 is furthermore connected to an output of the comparator 19. The output is formed by an open collector which, at one of the possible signal levels, is of high-ohmic character and thus does not affect the signals on the control input 36, while in the case of the other signal level a connection is effected between the control input 36 and ground potential.

Two resistors, 38, 39 connected as voltage dividers form the circuit 20 (FIG. 1) for the establishing of the limit value. The latter is fed with a switch signal S via an inverter 40. The position transmitter 3 (FIG. 1) is formed in the circuit arrangement of FIG. 2 by a potentiometer 41 the wiper of which is connected to the throttle-valve shaft and the path of which is acted on by a constant voltage of 5 V. The wiper of the potentiometer 41 conducts the actual-value signal Xd and is connected to the non-inverting input of the comparator 19.

Upon normal operation, the signal S has a level of 5 V (High) so that ground potential is present at the output of the inverter 40 and thus at the inverting input of the comparator 19. Since Xd cannot become negative, the output of the comparator 19 remains high-ohmic, so that signals which effect the opening of the throttle value pass unimpeded over the resistor 37 to the control input 36 of the output stage.

If, however, for one of the reasons already mentioned, the control or regulation is disconnected, then the switch signal S assumes a value of about 0 V (Low). The output voltage of the invertor 40 increases to 5 V so that a limit value of, for instance, 4.5 V given by the divider ratio of the voltage of divider resistors 38, 39, is present at the inverting input. Only when the throttle valve is in a region of small opening is the voltage value of the signal Xd greater than G, so that the opening of the throttle valve via the line 17 and the control input 36 is possible. However, if the throttle valve is opened further, then the voltage value Xd becomes smaller than the voltage fed to the inverting input and the comparator output connects the control input 36 to ground potential so that adjustment of the throttle valve via the line 17 is not possible.

Figure 3:
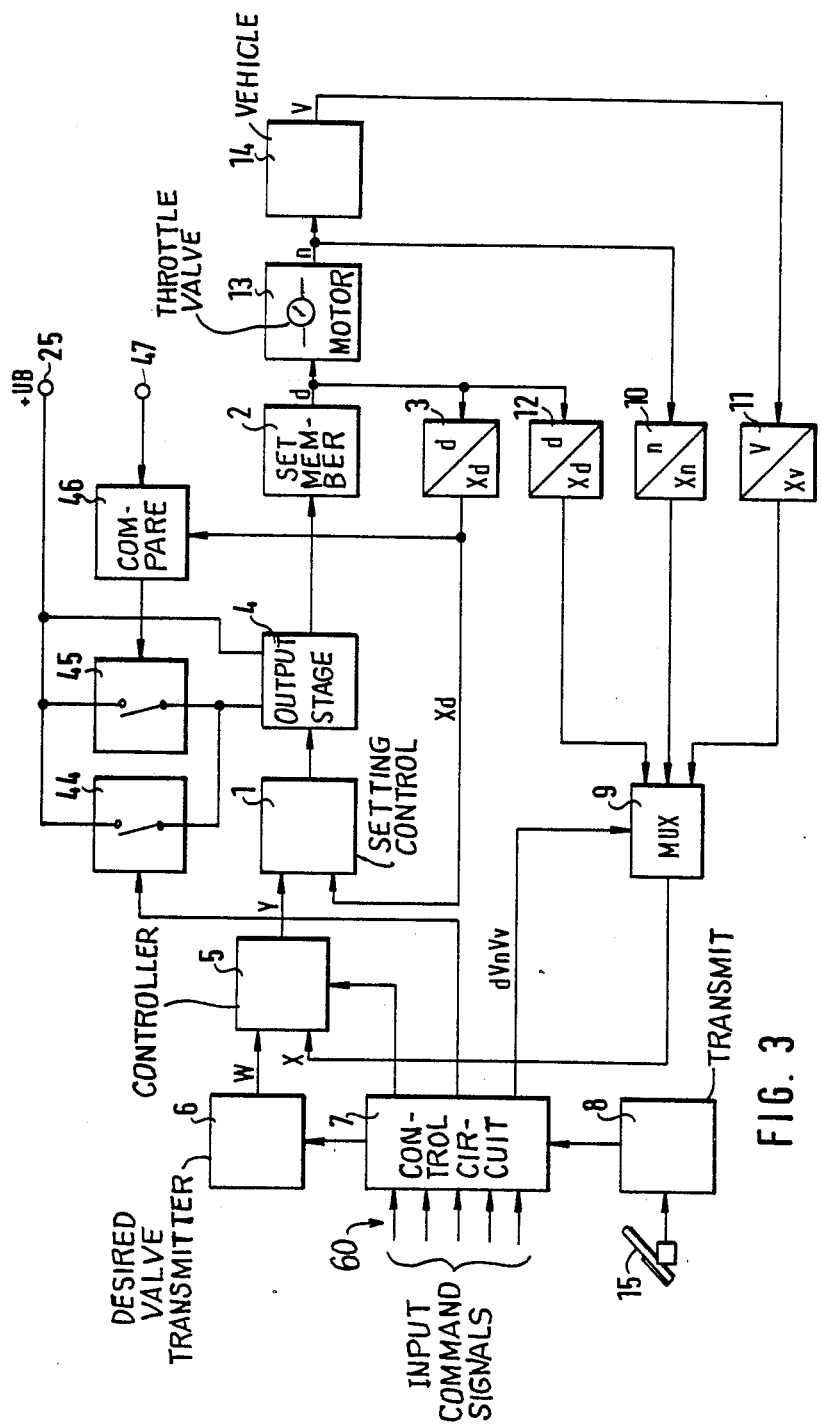
FIG. 3 is a block diagram of a second embodiment.

The circuit arrangement of FIG. 3 comprises a second embodiment in which connection the parts and functions known per se are similar to the circuit of FIG. 1. The output stage 4 is also developed as bridge output stage, its two branches being, however, separately connected to the positive pole 25 of the source of operating voltage. The feeding of operating voltage to that one of the transistors, which upon becoming conductive results in the opening of the throttle valve, takes place via a switch device consisting of two switches 44, 45 connected in parallel. The switch 45 is brought into non-conductive state by the control circuit 7 when the control or regulation is to be disconnected, whereupon the opening of the throttle valve is reduced. In order, however, to prevent the complete closing of the throttle valve and to permit idling control, the switch 45, in the case of throttle-valve positions in the idling range, is brought via a comparator 46 into the conductive state. The actual-value signal Xd, on the one hand, and, via an input 47, a limit value G, on the other hand, are fed to the comparator 46.

Figure 4:
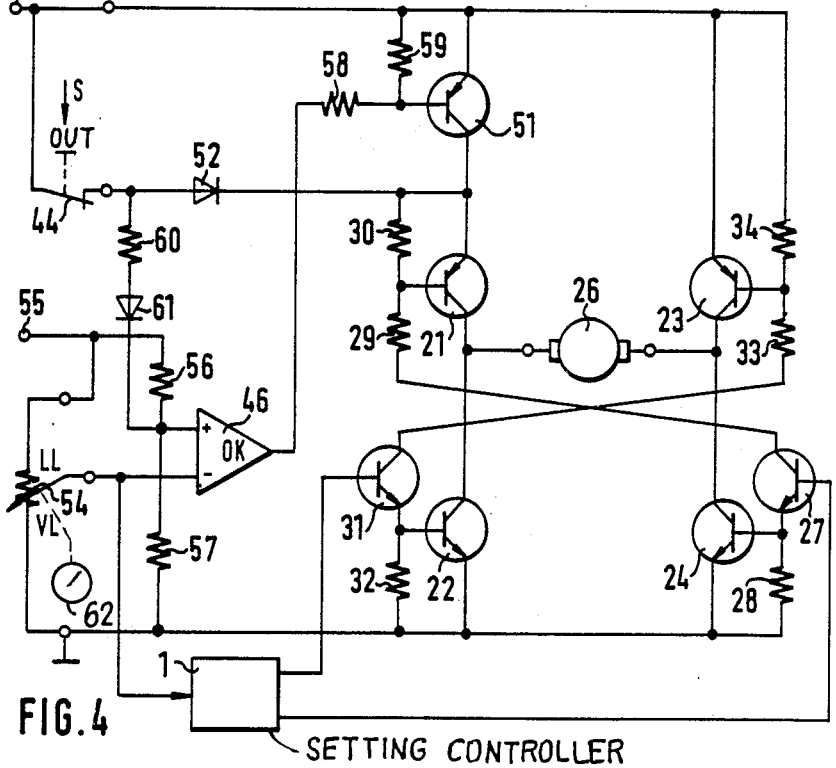
FIG. 4 shows a part of the circuit arrangement of FIG. 3 in greater detail.

FIG. 4 shows details of the output stage 4, the position transmitter 3 and the switch device 44, 45 in combination with the comparator 46 and the setting regulator 1. The output stage is developed in the same way as the output stage of FIG. 2 and explanation is therefore unnecessary. In the circuit arrangement in FIG. 4, however, the collector of the transistor 21 and the resistor 30 are not connected directly, but, on the one hand, via another transistor 51 and, on the other hand, via a diode 52 and the switch 44, to the positive pole 25 of the source of operating voltage. In normal operation, the transistor 21 receives positive voltage via the switch 44 and the diode 52. The switch 44 is brought into the non-conductive state when the control or regulation is disconnected,.

The position transmitter 3 is formed by the potentiometer 54, the wiper being acted on by a positive voltage (fed at 55, of, for instance, 3 V in the idle position), and is at ground potential in the case of full load. The wiper of the potentiometer 54 is connected to the inverting input of the comparator 46 while the non-inverting input receives a limit value via a voltage divider 56, 57. If the throttle valve is in the idle range when the switch 44 is non-conductive, then the voltage present on the inverting input is more positive than the voltage present on the non-inverting input. The output of the comparator 46 then connects a voltage divider of resistors 58, 59 arranged in front of the transistor 51 to ground potential, so that the transistor 51 becomes conductive and the throttle valve can be opened further.

However, if the throttle valve is in a more open position, then the voltage given off by the potentiometer 54 to the inverting input of the comparator 46 is less than the voltage at the non-inverting input, so that the output of the comparator 46 becomes high-ohmic and thus the transistor 51 is switched into the non-conductive state. Further opening of the throttle valve by the setting controller 1 is then no longer possible.

With the switch 44 closed, the limit value is raised to a higher value which is given not only by the resistors 56, 57 but also by the resistor 60. The diodes 52 and 61 prevent the limit value being influenced by the instantaneous state of the switching of the transistor 51 when the switch 44 is open, and thus prevents oscillation of the circuit formed by the comparator 46 and the transistor 51.

LEGENDS IN FIGURES 1 setting controller
2 setting member
4 output stage
5 controller
6 desired-value transmitter
9 multiplexer
13 motor
14 car
19 comparator
20 limit value
   input command signals to control circuit 7:
S−B, S+B, WA
off, brake
P/N, air-conditioning, idling load, full load
safety contact
temperature
46 comparator

I claim:

1. A safety circuit in an electronic velocity control system for a motor vehichle with idling control, the system including a setting device for adjusting the power of an engine of the motor vehicle;

means for feeding a desired value to the setting device, the setting device comprising a setting controller, an output stage and a setting member;

a throttle valve for controlling power of the engine, the throttle valve being operated by the setting member in response to an output signal of the output stage of the setting device, the controller operating a control signal which is fed to the output stage to provide the output signal for the setting member; and wherein the safety circuit comprises a switch device, a comparator, means for generating an actual value signal giving the position of the throttle valve, and means for generating a limit value signal; and wherein said switch device prevents a regulating of said output stage in a direction towards an opening of the throttle valve as a function of an output signal of the comparator, the actual-value signal and the limit value signal being fed to input terminals of the comparator, the limit value signal having a value necessary for idle control at least upon a disconnection of control by the system.

2. A safety circuit according to claim 1, further comprising a first signal line and a second signal line; and wherein the setting controller and the output stage are connected to the first line for signals for regulating the output stage in a direction to effect a closing of the throttle valve and to the second line for signals for regulating the output stage in a direction to effect an opening of the throttle valve; and the switch device is connected within the second line.

3. A safety circuit according to claim 2, further comprising a bridge stage having a first and a second control input respectively for each direction of rotation of the throttle valve; and a resistor interposed in the second line and connecting to the first control input of the bridge stage, actuation of the first control input of the bridge stage, effecting an opening of the throttle valve; and wherein an output of the comparator is connected to the first control input of the bridge stage.

4. A safety circuit according to claim 3, wherein the limit value generating means comprises a voltage divider; and a switch signal is fed to the comparator via a branch of the voltage divider.

5. A safety circuit according to claim 3, wherein
the comparator is formed by an operational amplifier having an output with open collector.

6. A safety circuit according to claim 3, wherein the bridge stage comprises
a second switch device; and
a first set and a second set of semiconductor switches, said first set of the semiconductor switches being brought into the conductive state for an opening of the throttle valve by connection via the second switch device to one pole of a source of operating voltage.

7. A safety circuit according to claim 6, wherein
the second switch device comprises two switches connected substantially parallel to each other; and
a first one of which switches is controlled by a switch signal and the second one of which switches is controlled by an output signal of the comparator.

8. A safety circuit according to claim 7, wherein
the second switch of the second switch device comprises a transistor in circuit with a voltage divider, a base of the transistor being connected via the voltage divider to a non-inverting input of the comparator; and wherein
the safety circuit further comprises a first diode, a second diode, and a resistor; and
a terminal of the first switch of the second switch device which faces away from a pole of the source of operating voltage is connected via the first diode to the collector of the foregoing transistor and by the resistor and the second diode, to a non-inverting input of the comparator, the first and the second diodes being of opposite polarization when the first switch of the second switch device is opened.

9. A safety circuit according to claim 1, wherein
in the case of an E-gas system, the position of an accelerator pedal is fed to the controller as a desired value signal, and the position of the setting member is fed to the controller as actual value signal.

10. A safety circuit according to claim 1, wherein
in the case of a velocity control system, a stored desired value is feedable to the controller and, as actual value, the velocity of the vehicle is feedable to the controller.

11. A safety circuit according to claim 1, wherein
the speed of rotation is feedable as an actual value to the controller.

* * * * *